April 22, 1930.  A. DRINKWATER  1,755,870
TIRE CHAIN HOOK
Filed April 26, 1929
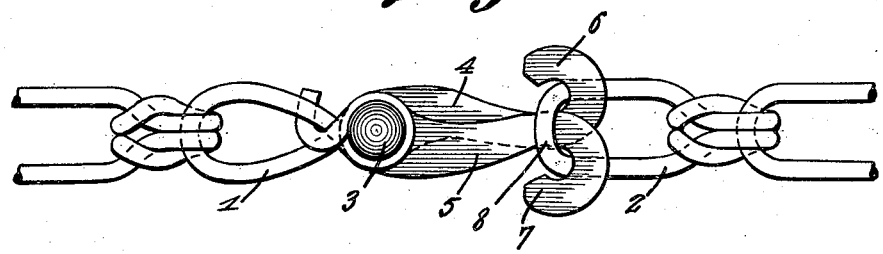
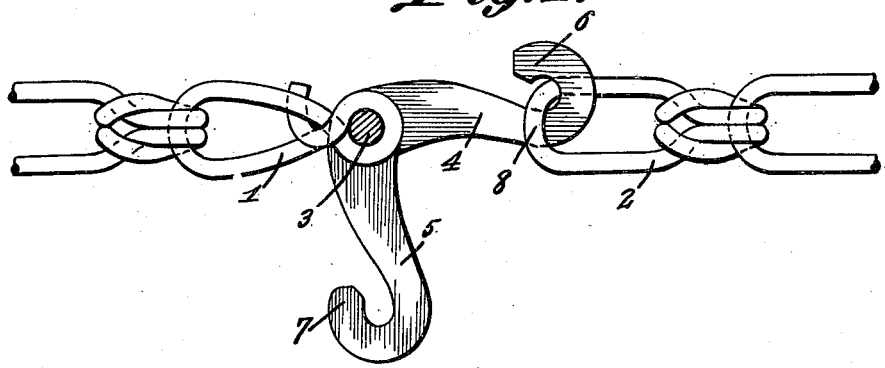
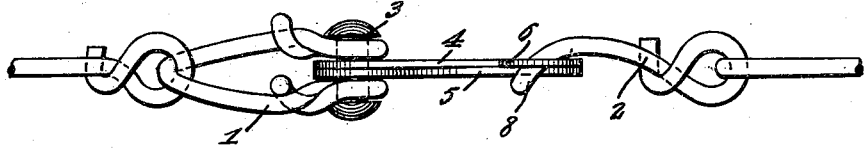
Anson Drinkwater, INVENTOR
BY *Victor J. Evans*
ATTORNEY Patented Apr. 22, 1930

1,755,870

UNITED STATES PATENT OFFICE

ANSON DRINKWATER, OF NEW HARTFORD, NEW YORK

TIRE-CHAIN HOOK

Application filed April 26, 1929. Serial No. 358,393.

My present invention has reference to a simple, cheaply constructed, easily operated and thoroughly effective means for locking the end links of an anti-skid or like chain.

In carrying out my invention it is my purpose to pivotally secure to one of the end links of a chain the ends of two hooks which have their rounded beaks oppositely and outwardly directed and to round or arch the link at the second end of the chain for the reception of the beaks of the hooks, and whereby, when the chain ends are so connected it will be impossible for them to become accidentally disassociated regardless of the strain or vibration to which they are subjected.

To the attainment of the foregoing the invention consists in the improvement hereinafter described and definitely claimed.

In the drawings:

Figure 1 is a side elevation showing the ends of an anti-skid or like chain connected in accordance with this invention.

Figure 2 is a similar view showing one of the hooks swung out of engagement with one of the end links of the chain.

Figure 3 is an edge view of the construction as disclosed by Figure 1.

In the drawings the end links of an anti-skid or like chain are indicated by the numerals 1 and 2, respectively. The end link 1 has its ends rounded upon itself to provide eyes for the reception of a double headed pivot 3. Journaled on this pivot there are the ends of the body portions of the connecting hooks 4 and 5, respectively. The body portions of the hooks 4 and 5 are oppositely rounded and merge into outwardly directed beaks or hooks proper 6 and 7, respectively. The ends of the hooks are, of course, directed toward the body portions thereof.

The end link 2 of the chain is arched or rounded upon itself, so that the extremity thereof, on the end adjacent to the link 1 is bowed, as at 8. The hooks 4 and 5 are separately inserted in the link 2, it being necessary, of course, to cant the hooks in opposite directions in order that their beaks can be received through the bowed portion of the link 2 and engage with the end of the said bowed portion as well as with the sides of the said link. The oppositely directed beaks of the hooks when engaged with the link 2 will positively prevent the disassociation of the said link from the hooks.

The construction is extremly simple and the advantages thereof will, it is thought, be apparent to those skilled in the art to which such invention relates.

Having described the invention, I claim:

1. In combination with the end links of an anti-skid chain or the like, of hooked members having their body portions pivotally secured to the outer end of one of said links, the body of the hooks being oppositely rounded and the said hooks merging into outwardly directed rounded beaks for engagement with the second end link of the chain.

2. In combination with the end links of an anti-skid chain or the like, of hooked members having their body portions pivotally secured to the outer end of one of said links, the body of the hooks being oppositely rounded and the said hooks merging into outwardly directed rounded beaks for engagement with the second end link of the chain, and the said second end link of the chain being arched longitudinally.

In testimony whereof I affix my signature.

ANSON DRINKWATER.